US005116578A

United States Patent [19]

Baxter

[11] Patent Number: 5,116,578

[45] Date of Patent: May 26, 1992

[54] VIAL SLEEVE

[76] Inventor: James A. Baxter, 73a Friern Barnet Lane, London N20 0XT, United Kingdom

[21] Appl. No.: 108,670

[22] Filed: Oct. 15, 1987

Related U.S. Application Data

[63] Continuation of Ser. No. 593,274, Mar. 26, 1984, abandoned.

[30] Foreign Application Priority Data

Mar. 26, 1983 [GB] United Kingdom ................. 8308378

[51] Int. Cl.[5] ............................................ G01N 35/02

[52] U.S. Cl. ....................................... 422/63; 422/62; 422/64; 422/65; 422/104; 141/130; 220/737

[58] Field of Search .................................. 422/61-65, 422/102, 104; 220/85 H, 96; 141/130, 98

[56] References Cited

U.S. PATENT DOCUMENTS

| | | | |
|---|---|---|---|
| 3,027,799 | 4/1962 | Weichselbaum | 422/104 |
| 3,615,239 | 10/1971 | Jones et al. | 422/65 |
| 3,807,955 | 4/1974 | Note, Jr. et al. | 422/102 |
| 3,916,157 | 10/1975 | Roulette et al. | 422/104 |
| 3,938,735 | 2/1976 | Wright et al. | 220/3 |
| 4,000,976 | 1/1977 | Kramer et al. | 422/65 |
| 4,039,288 | 8/1977 | Moran | 422/65 |
| 4,094,641 | 6/1978 | Friswell | 422/102 |
| 4,208,484 | 6/1980 | Sozi et al. | 422/72 |
| 4,256,697 | 3/1981 | Baldwin | 422/102 |
| 4,278,437 | 7/1981 | Haggar | 422/102 |
| 4,483,616 | 11/1984 | Liston et al. | 422/102 |
| 4,518,076 | 5/1985 | Feisel et al. | 422/65 X |

*Primary Examiner*—Lynn Kummert
*Attorney, Agent, or Firm*—Diller, Ramik & Wight

[57] ABSTRACT

An autosampler is provided having a carrier and openings for receiving large diameter vials and moving the same to a sampling station at which a probe can aspirate liquid therefrom. In cases where the volume/height of the liquid is so low as to prevent aspiration, the conventional large diameter vial is not used and instead a sleeve with a smaller volume vial located therein is positioned in the carrier opening which elevates the level of the liquid in the vial rendering it accessible to the probe and capable of being aspirated thereby for subsequent sampling.

6 Claims, 2 Drawing Sheets

VIAL SLEEVE

This application is a continuation of application Ser. No. 06/593,274, filed Mar. 26, 1989, now abandoned.

BACKGROUND OF THE INVENTION

In the analytical sciences it has become increasingly common-place to use instruments with automatic sampling facilitates (autosamples), e.g. with chromatographs or spectrophotometers. Such facilities usually take the form of a carousel arrangement in which vials containing samples for examination are located around the periphery of the carousel. Thus, samples may be separately presented for analysis on rotation of the carousel. Each auto-sampler is arranged to accept only one size of vial. Thus, while one autosampler is arranged to accept one size of a vial, another autosampler will only accept a different size of vial.

A typical conventional autosampler manufactured by Magnus Scientific Instrumentation Ltd. includes a turntable having openings for receiving vials which in turn house the samples which are to be analyzed. Typically, a needle is introduced into each vial, a sample removed from each vial, analyzed, the needle purged, the turntable rotated to the next vial position, the needle again inserted into the next vial, and the sampling recommences. A specific Magnus autosampler as aforesaid is identified by Model No. M7110 which has been in use and generally available to the public from at least 1981. A similar autosampler which has been available at least as early as Feb. 1983 is Model LC 241 of Dynatech Precision Sampling Corp. of Baton Rouge, LA.

A known disadvantage of such autosamplers is that it is not normally possible for a needle, probe or other extraction device to remove all of the sample from any given vial in the sampler. In some instances, due to the size of the gap between the bottom of the vial and the lower extremity of the extraction device, the amount of available sample is simply too small for withdrawal.

In cases where an adequate volume of sample is available, the existence of a gap between the bottom of the vial and the extraction device presents no problem, but many laboratories, especially those in hospitals, frequently have to accept inadequate sample volumes for examination, and difficulties may then arise.

Thus, there is a clear need to provide a low volume vial which inside is sufficiently narrow to cause displacement of the sample contents when an extraction device enters the vial, enabling small quantities to be extracted from small sample volumes. Preferably, the vial also has an external convex-shaped bottom.

Unfortunately, vials meeting these requirements have been found to be too narrow to fit into typical autosampler devices, or if not, need to be specially made for the requirement and so would prove to be very costly.

SUMMARY OF THE INVENTION the present invention relates to locating and supporting sleeves for vials, and in particularly to sleeves of a certain shape and size for locating and supporting vials in analytical instruments.

Thus, the present invention provides a precision locating and supporting sleeve for a vial which enables the user to fit the vial accurately into a variety of different autosamplers.

Accordingly, the present invention provides a cylindrical, vial locating and supporting sleeve with a coaxial cylindrical bore in which the ratio of the height of the sleeve to its outside diameter is in the range of 1.5 to 4.5 and the ratio of the outside diameter of the sleeve to the inside diameter is in the range of 1.5 to 2.75.

The present invention also provides a combination of the sleeve defined in the previous paragraph and a vial when located and supported by the sleeve relative to an autosampler or the like. Preferably, the material of the vial sleeve is poly-tetra-fluoro-ethylene (PTFE), though other suitable materials such as other plastics, glass, wood, metal, may also be used. The bore of the vial sleeve is desirably open at both ends, though it may be closed or partially closed at one end in some instances.

Advantageously, the vials have a cylindrical collar of slightly greater diameter than their cylindrical body primarily to provide means for receiving a crimped-on cap to seal the vial. The collar also helps to optimize the relative heights of the vial, sleeve and sampler needle. The bore of the sleeve may be partially widened at its entrance to accommodate the collar portion.

Typically, a support sleeve has a height of between 25 and 40 mm, an outside diameter of between 9 and 15 mm and an inside diameter of 5.8 mm. A typical preferred vial of borosilicate glass with a convex end portion has a length of 32 mm, an outside diameter of 5.6 mm and a collar of 7 mm diameter, thus providing a firm and positive fit within a locating and supporting sleeve. A vial of these dimensions would have a liquid capacity of approximately 0.3 ml.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
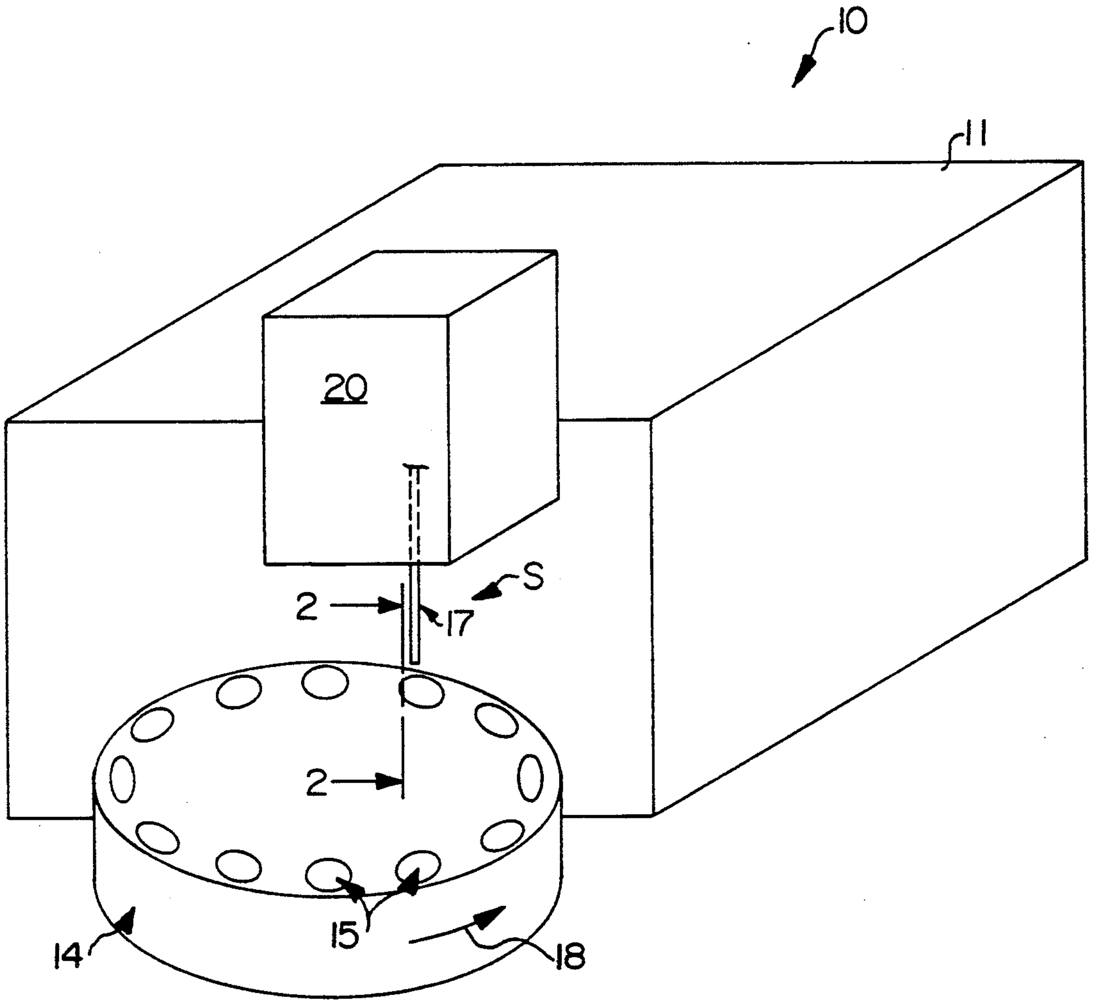
FIG. 1 is a highly schematic perspective view of a conventional autosampler, and illustrates a carrier having a plurality of openings into each of which is positioned a conventional vial with each vial being indexed to a position below and in alignment with an aspirator needle or probe.
Figure 2:
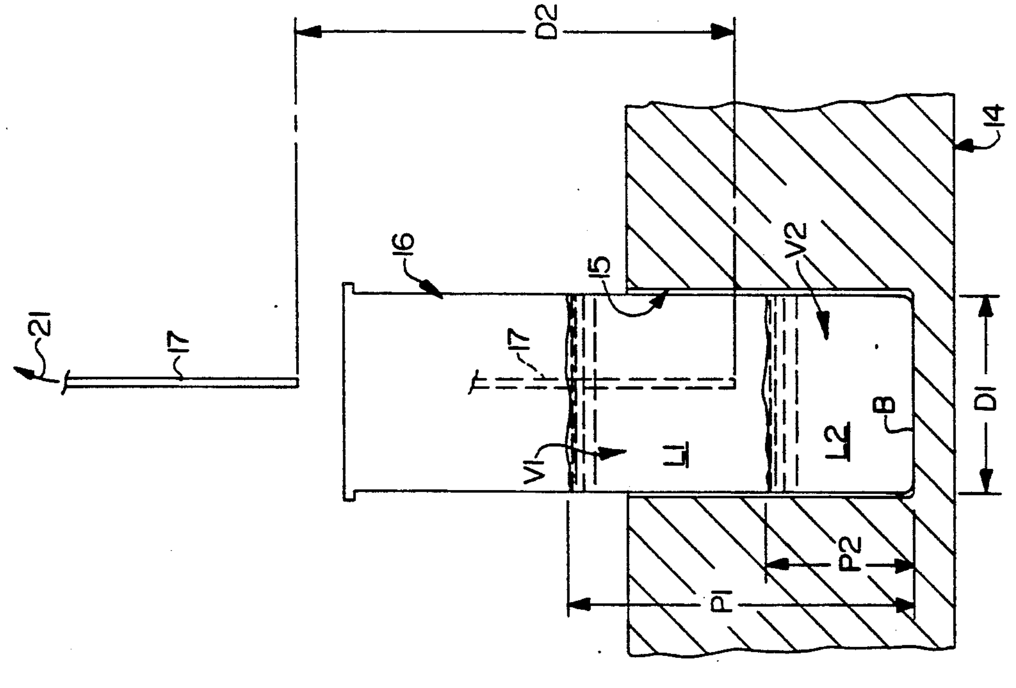
FIG. 2 is a highly enlarged cross-sectional view taken generally along line 2—2 of FIG. 1, and illustrates various liquid levels and volumes within a conventional vial and the position of the probe prior to and after descent into the conventional vial.

A conventional autosampler 10 is illustrated in FIG. 1 of the drawings and includes a carrier 14 having a plurality of relatively large diameter openings 15 into which each of is positioned a conventional relatively large outer diameter vial 16 (FIG. 2).

Amongst commercially available autosamplers in association with which the present invention may be readily used are those manufactured by Beckman Instruments Inc. of Fullerton, California, USA; Dani SpA of Monza, Italy; Kontron AG of Zurich, Switzerland; Magnus Scientific Limited of Milton Keynes, Bucks, England; Perkin-Elmer Corporation of Norwalk, Connecticut, USA; Precision Sampling Company of Baton Rouge, Louisiana, USA; Pye Unican Limited of Cambridge, England; Spectra-Physics Inc. of San Jose, California, USA; Varian Associates Inc. of Palo Alto, California, USA; and Hewlett-Packard of Waldbronn, West Germany.

Conventional means 18 (FIG. 1) move the carrier 14 to present each opening 15 and, therefore, each large diameter valve 16 below and in alignment with an aspirator needle or probe 17 which is part of overall means 20 which move the probe 17 a predetermined distance D2 (FIG. 2) into the large diameter valve 16. In FIG. 2 the probe 17 is shown in phantom outline at a position inserted into the large diameter vial 16 into a liquid L1 which is of a predetermined depth P1 measured from the upper surface of the liquid L1 and the bottom wall B of the large diameter of the vial 16. The liquid L1 can then be withdrawn by conventional means 21 (FIG. 2), and this liquid is then subsequently conventionally tested.

If the liquid L2 (FIG. 2) in the large outer diameter vial 16 is at a predetermined height or level P2 (FIG. 2) below that of the typical probe 17, obviously, the probe 17 cannot aspirate or withdraw the liquid L2 from the smaller volume V2. Accordingly, the problem recognized by the patentee is the fact that in the case of low volume V2 samples in conventional large diameter vial 16, the sample L2 could not be tested by the conventional autosampler 10. The problem is compounded by the fact that virtually all autosamplers do not conform to any standards and each manufacturer builds its autosampler in a specific fashion to accommodate a specific size (height, diameter and volume) of vial 16 and maintains the distance D2 fixed. In other words, in all of the autosamplers latter described, the distance D2 will vary between autosamplers but is fixed within each autosampler and, thus, each autosampler possesses the inherent disadvantage/problem of its probe 17 being incapable of aspirating a low level P2 (FIG. 2) and low volume V2 of liquid L2 from its particular standard conventional large diameter vial 16.

Presented with the problem, the patentee provided the solution in accordance with the present invention illustrated in FIG. 3 in which, once again, the carrier 14 and the large diameter opening 15 are conventional, as is the probe 17. Thus, the probe 17 also will move the same predetermined fixed distance D2. In accordance with the present invention, the large diameter vial 16 is, of course, not utilized and instead a so-called precision vial locating and supporting device or sleeve 12 is provided. The sleeve 12 has an exterior diameter ES which corresponds or matches the diameter D1 (FIG. 2) of each of t he openings 15. The sleeve 12 also includes a small interior diameter D defining a cylindrical interior surface IS in which is located a small diameter vial 13 (FIG. 3). the small diameter vial has a predetermined height L and a volume V3 measurably smaller than that of the vial 16. Furthermore, the sleeve 12 has a predetermined height H which in association with the small diameter vial 13 locates the vial 13 such that the end (unnumbered) of the probe 17 is immediately adjacent the bottom (unnumbered) of the small diameter vial 13. Thus, though the volume V2 of the liquid L2 could not be reached and, thus, aspirated by the probe 17 of FIG. 2, the same liquid when introduced into the smaller volume V3 of the smaller vial 13 can be reached and thus aspirated by the probe 17.

It is important to note that the distance D2 remains unchanged when the autosampler 10 is used with standard large diameter vials 16 (FIG. 2) or with the sleeves 12 and small diameter vials 13 (FIG. 3) of this invention.

Figure 3:
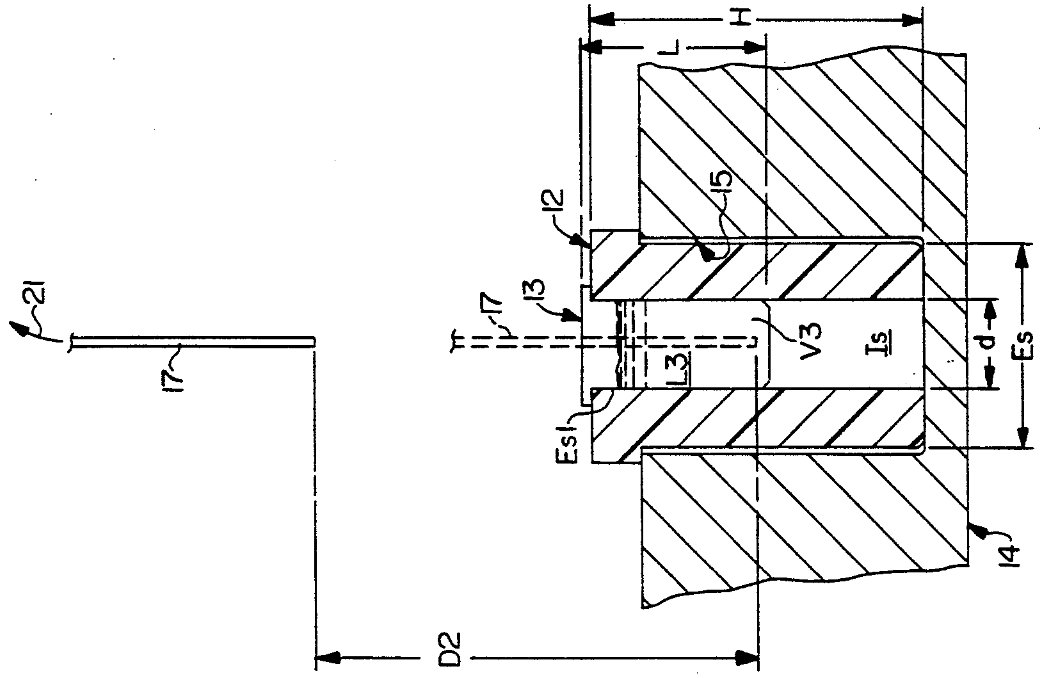
FIG. 3 is a fragmentary cross-sectional view also taken generally along line 2—2 of FIG. 1, but illustrates the conventional vial removed and in lieu thereof an opening of the carrier houses a precision vial locating and supporting device or sleeve of the present invention and a small vial located therein.

The small diameter vial 13 is shown in FIG. 3 axially shorter than the conventional valve 16, but as a practical matter the axial length of the vial 13 can correspond identically to the axial length (height) of the vial 16. However, if the vial 13 shown in FIG. 3 corresponded in length to the vial 16 shown in FIG. 2, the probe 17 might not project into the liquid L3 of the volume V3 because the inside diameter of the vial 13 is not small enough to, in effect, elevate the volume V3 of the liquid L3 sufficiently to be penetrated by the probe 17. Thus, in such cases it is, obviously, necessary to further reduce the diameter of the valve 13 which would correspondingly result in the liquid L3 rising higher in such a narrower diametered vial. As a practical example of the latter, in a standard or conventional valve 16 the so-called dead volume or dead space between the probe 17 and the bottom B of the vial 16 is typically between 150–250 μl. However, the smaller diametered vial 13 (FIG. 3) corresponding in length to the conventional vial 16 has a dead volume between the bottom of probe 17 and the bottom of this standard length, though small diametered vial of typically between 15–30 μl. Obviously, a low volume V2 specimen in the conventional vial 16 would not be penetrated by the probe 17, yet the same volume V3 would be penetrated by the latter-described vial without, of course, any change whatever in conventional autosamplers 10 and the throw or travel of the probe 17 associated with each.

In this manner, in the absence of any change whatsoever in the conventional autosampler 10, the simple utilization of a particular sleeve 12 and a small diameter vial 13 renders an otherwise incompatible autosampler and large diameter vial 16 (FIGS. 1 and 2) compatible (FIG. 3) for low volume liquid aspiration (testing). Accordingly, all that one need do is provide a particular sleeve 12 and a particular small diameter vial 13 for a particular autosampler 10, and otherwise inaccessible small volumes V2 of liquid L2 which are otherwise heretofore inaccessible can be rendered accessible to the associated probe 17.

Although a preferred embodiment of the invention has been specifically illustrated and described herein, it is to be understood that minor variations may be made in the apparatus without departing from the spirit and scope of the invention, as defined the appended claims.

I claim:

1. A combination comprising an autosampler, a precision vial locating and supporting device and a plurality of precision vials wherein the autosampler includes a carrier having means defining a plurality of relatively large diameter openings, each opening being positioned and arranged for normally receiving a conventional relatively large outer diameter vial of a predetermined standard outer diameter, said autosampler including a sampling station, a probe at said sampling station, means for moving said carrier to present individual ones of said plurality of carrier openings in general alignment with said probe, means for effecting relative movement between said probe and each carrier opening to move said probe a predetermined distance toward each carrier opening; said probe being positioned and arranged to move a predetermined distance into a conventional vial near a bottom thereof to withdraw liquid therefrom when the liquid is at a first predetermined depth and volume but being incapable of withdrawing liquid therefrom when the liquid is at a second predetermined depth and volume below said first predetermined depth, said precision vial locating and supporting device comprising a plurality of sleeves, each sleeve having a preselected height, an exterior surface of a preselected diameter, an interior surface of another preselected diameter, and means defined by the exterior surface thereof for accurately matching each large diameter opening of said autosampler, each sleeve being accurately fitted in an associated one of said autosampler openings, means defined by the interior surface of each sleeve or accurately matching an exterior surface of a relatively small outer diameter vial, a small outer diameter vial accurately fitted in each sleeve interior surface whereby an otherwise incompatible small outer diameter vial and larger diameter opening autosampler are rendered compatible, each small outer diameter vial being generally aligned with and being of a length to accommodate said probe when said probe is moved said predetermined distance into each small vial, each small vial being of a reduced interior diameter as compared to a conventional relatively large outer diameter vial, the small vial diameter and length further rendering accessible to said probe a volume of liquid in said small vial corresponding to said second volume when said probe is moved said predetermined distance, and said autosampler probe including means for withdrawing liquid from each small outer diameter vial when said small outer diameter vial is in a respective sleeve at said sampling station.

2. The combination as defined in claim 1 wherein said interior surface is an axial bore in which the ratio of the height of the sleeve to said exterior surface diameter is in the range of 1.5 to 4.5, and the ratio of said exterior surface diameter to said interior surface diameter is in the range of 1.5 to 2.75.

3. The combination as defined in claim 1 wherein said interior surface defines a bore open at both ends.

4. The combination as defined in claim 1 wherein said interior surface defines a bore closed at one end.

5. The combination as defined in claim 2 wherein said interior surface defines a bore open at both ends.

6. The combination as defined in claim 2 wherein said interior surface defines a bore closed at one end.

* * * * *